US012746168B2

(12) United States Patent
Wilber et al.

(10) Patent No.: US 12,746,168 B2
(45) Date of Patent: Sep. 29, 2026

(54) BACKER BOARD FOR CASKET INTERIOR ARRANGEMENT

(71) Applicant: Vandor Group, Inc., Richmond, IN (US)

(72) Inventors: Brent Wilber, Richmond, IN (US); Justin Davis, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/438,245

(22) Filed: Feb. 9, 2024

(65) Prior Publication Data

US 2024/0269029 A1 Aug. 15, 2024

Related U.S. Application Data

(60) Provisional application No. 63/484,179, filed on Feb. 9, 2023.

(51) Int. Cl.
*A61G 17/04* (2006.01)
*A61G 17/02* (2006.01)

(52) U.S. Cl.
CPC .......... *A61G 17/042* (2016.11); *A61G 17/028* (2017.05)

(58) Field of Classification Search
CPC .... A61G 17/042; A61G 17/028; A61G 17/02; A61G 17/034; A61G 17/0076; A61G 17/0106; A61G 17/0073
See application file for complete search history.

(56) References Cited

U.S. PATENT DOCUMENTS

| | | | | | |
|---|---|---|---|---|---|
| 2,637,137 | A | * | 5/1953 | Flynn | A61G 17/042 52/249 |
| 2,867,030 | A | * | 1/1959 | Hillenbrand | A61G 17/036 27/14 |
| 2,947,059 | A | * | 8/1960 | Hillenbrand | A61G 17/042 27/19 |
| 2,964,824 | A | * | 12/1960 | Hillenbrand | A61G 17/042 27/19 |
| 3,162,923 | A | * | 12/1964 | Kaeser | A61G 17/0136 27/19 |
| 3,228,085 | A | * | 1/1966 | Nelson | A61G 17/0136 27/19 |
| 3,344,494 | A | | 10/1967 | Mcclive | |
| 3,395,431 | A | * | 8/1968 | Carson, Jr. | A61G 17/02 D99/7 |

(Continued)

*Primary Examiner* — William L Miller
(74) *Attorney, Agent, or Firm* — Maginot, Moore & Beck LLP

(57) ABSTRACT

A casket includes a casket body, at least a first lid, and a backer board. The casket body is configured to receive an adult human body in the supine position. The lid has a first bottom interior ledge defining a first nook in an underside of the lid, and a second bottom interior ledge defining a second nook in the underside of the lid. The backer board is formed of a pliable material, and includes a center wall having a first edge and an opposite second edge. The backer board also includes a first side wall extending away from the first edge, and a second side wall extending away from the second edge. The first side wall and the second side wall are configured to engage, respectively, the first and second nooks, under a tension configured to hold the center wall in a predetermined position.

17 Claims, 8 Drawing Sheets

(56) References Cited

U.S. PATENT DOCUMENTS

| | | | | | |
|---|---|---|---|---|---|
| 3,735,457 | A * | 5/1973 | Esterdahl | A61G 17/0136 | 27/19 |
| 3,831,230 | A * | 8/1974 | Rawlings | A61G 17/042 | 52/63 |
| 3,835,509 | A * | 9/1974 | Esterdahl | A61G 17/0136 | 27/19 |
| 4,357,741 | A | 11/1982 | Winburn et al. | | |
| 5,495,648 | A * | 3/1996 | Rojdev | A61G 17/028 | 27/19 |
| 5,675,877 | A * | 10/1997 | Lewis | A61G 17/04 | 27/14 |
| 6,151,762 | A * | 11/2000 | Cox | A61G 17/02 | 27/14 |
| 6,237,202 | B1 | 5/2001 | Agee et al. | | |
| 6,502,287 | B2 * | 1/2003 | Mlchaud | A61G 17/042 | 27/19 |
| 6,742,231 | B1 * | 6/2004 | Calhoun | A61G 17/04 | 27/14 |
| 7,478,462 | B2 * | 1/2009 | Robert | A61G 17/04 | 27/19 |
| 8,307,519 | B2 * | 11/2012 | Drew | A61G 17/04 | 27/14 |
| 8,667,653 | B2 * | 3/2014 | Drew | A61G 17/0106 | 27/14 |
| 9,050,234 | B2 * | 6/2015 | Cox | A61G 17/034 | |
| 10,434,025 | B1 * | 10/2019 | Davis | B32B 5/26 | |
| 2006/0059670 | A1 * | 3/2006 | Robert | A61G 17/04 | 27/19 |

* cited by examiner

BACKER BOARD FOR CASKET INTERIOR ARRANGEMENT

This application claims the benefit of U.S. Provisional Patent Application Ser. No. 63/484,179, filed Feb. 9, 2023, which is incorporated herein by reference.

FIELD OF THE INVENTION

The present invention relates generally to casket tops, and more particularly, to decorative casket top interiors.

BACKGROUND OF THE INVENTION

Burial caskets often include a decorative lid underside, or casket top interior, for purposes of viewing. In particular, during the viewing period of a funeral, the casket lid is often opened to permit viewing of the deceased. The lid may fully open, or partially open over the top portion of the body, for example, in a casket having a common two-part lid. While open, the casket top interior is prominently displayed. It is thus desirable for the casket top interior, or at least the portion that opens for the viewing, to be aesthetically pleasing.

To this end, the casket industry has widely employed certain decorative mechanisms in casket top interior design. One common casket top interior design that includes rolls and a center panel. The rolls are shaped design features that extend inward from each edge of the casket top to form a picture frame effect. The center panel is disposed within the casket top such that the center panel is substantially bordered by the rolls. Both the center panel and rolls typically have a finished appearance and hide the otherwise functional and non-aesthetic underside of the metal or wood casket. U.S. Pat. Nos. 6,151,762 and 10,434,025 show examples of such casket top interiors.

Because of the prominent nature of the casket top interior during the viewing, a desirable feature offered by casket manufacturers are center panels having different and selectable ornamental designs. The center panel may include religious symbols, poetry, or prayer material deemed appropriate for the deceased. Such designs are typically embroidered or otherwise affixed to fabric, which is then glued or stapled to the center board. In some cases, the center panels are interchangeable such that casket consumers can select a personalized decorative center panel for installation into one of a number of standard casket models. In any event, most center panels are constructed of a semi-rigid or rigid base panel and a fabric covering.

A drawback to the use in such center panels is the manufacturing time and complexity involved in providing the rolls and center panel in a reliably presentable fashion. It is known to provide a shaped corrugated cardboard (i.e. corrugated fiberboard or corrugated paper) blank that can be folded and fit into the underside of the casket lid to shape the rolls, and to provide a frame for the center panel. However, these designs often require further cardboard or wooden support between the folded cardboard roll and the underside of the casket lid itself to maintain shape. While such corrugated fiberboard supports for cardboard rolls are known, they are not completely reliable in many casket designs, and/or required complicated attachment mechanisms.

A need exists, therefore, for a casket interior design that has increased convenience in manufacturing and reliability in use.

SUMMARY

The embodiments described herein address the above-described needs, as well as others, but providing a casket top interior that includes a foldable snap locking backer board for supporting the rolls and/or an optional center panel.

In one embodiment, a back board for a casket top interior includes a center wall and at least two side walls configured to engage a nook in the underside of a casket lid under a tension configured to hold the center wall in a predetermined position. In one further embodiment, each of the two side walls has a fold back portion that is folded back behind the center wall, and a main portion that is folded back again from the fold back portion to extend away from the center wall and the fold back portion.

The above-described features and advantages, as well as others, will become more readily apparent to those of ordinary skill in the art by reference to the following detailed description and accompanying drawings.

DETAILED DESCRIPTION

Figure 1:
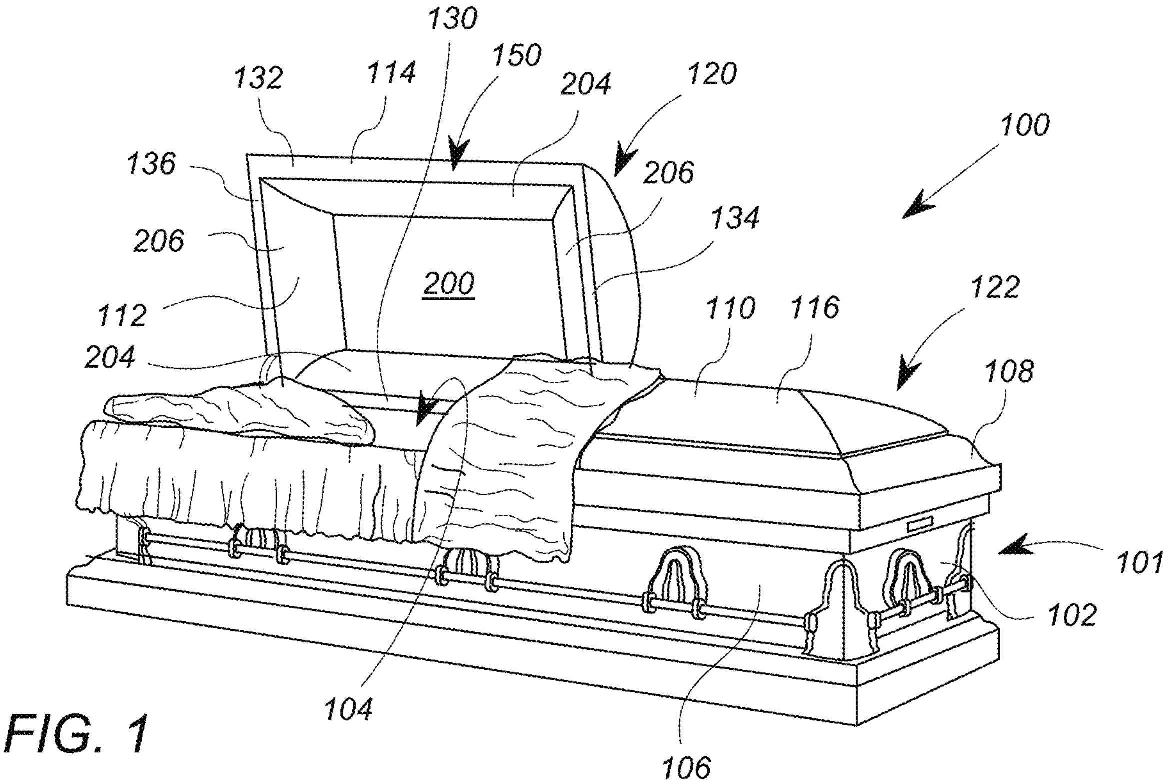
FIG. 1 shows a perspective view of a casket according to a first embodiment.

FIG. 1 shows a casket 100 according to a first embodiment incorporating a casket top interior 150 and a center panel 200. The casket 100 includes a casket body 101, a first lid 120, a second lid 122, and the casket top interior 150. The casket body 101 is a container having an interior 104 configured to receive an adult human body in the supine position, and includes a front wall 106, and opposing back wall, not visible in FIG. 1, a first end wall 102 and a second end wall, not visible in FIG. 1. The casket body 101 may take any form as is known in the art, and may suitably be formed primarily of wood or metal, or wood-like products, or even corrugated fiberboard.

Figure 2:
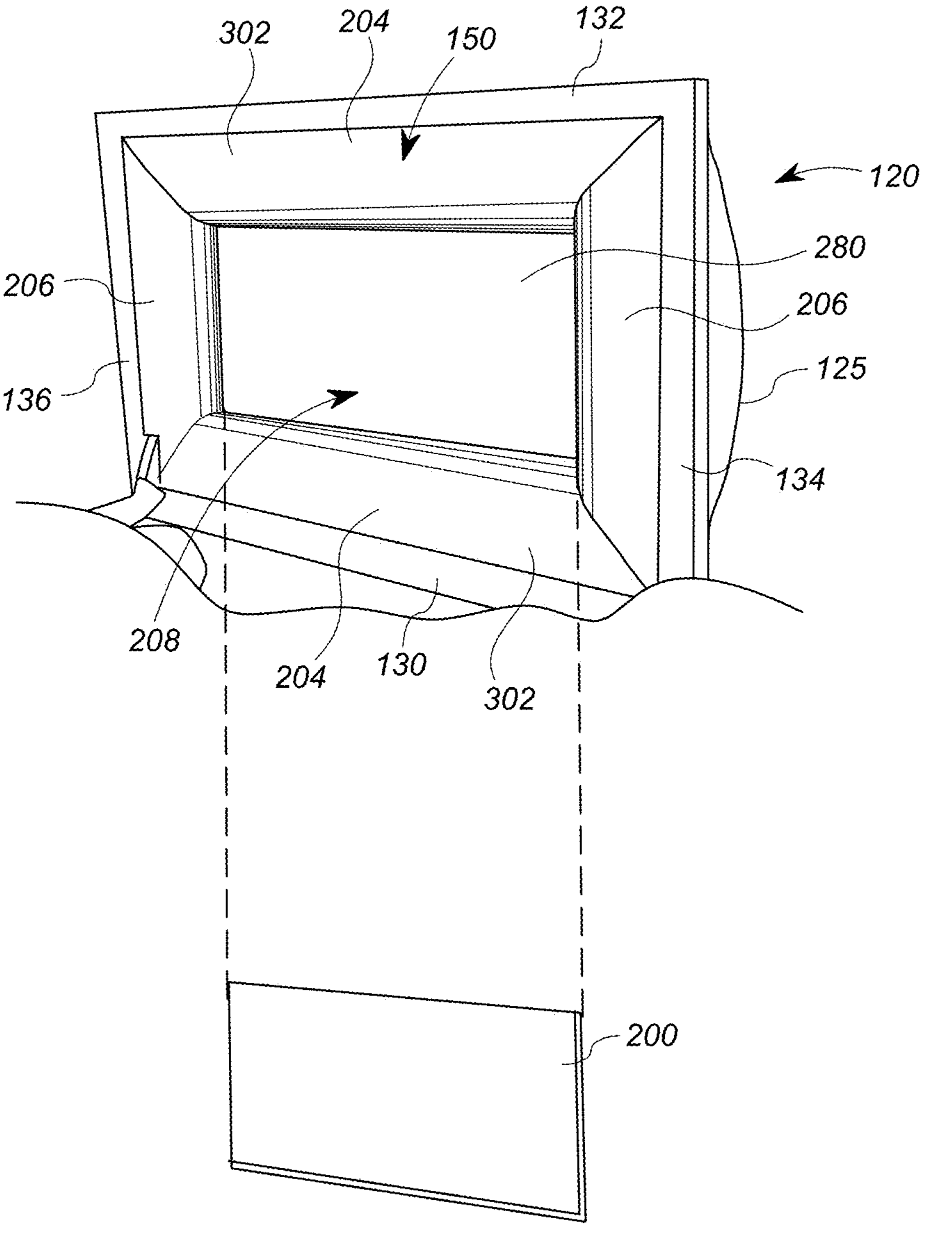
FIG. 2 shows a perspective view of a lid of the casket of FIG. 1 including an exemplary embodiment of a casket top interior.
Figure 3:
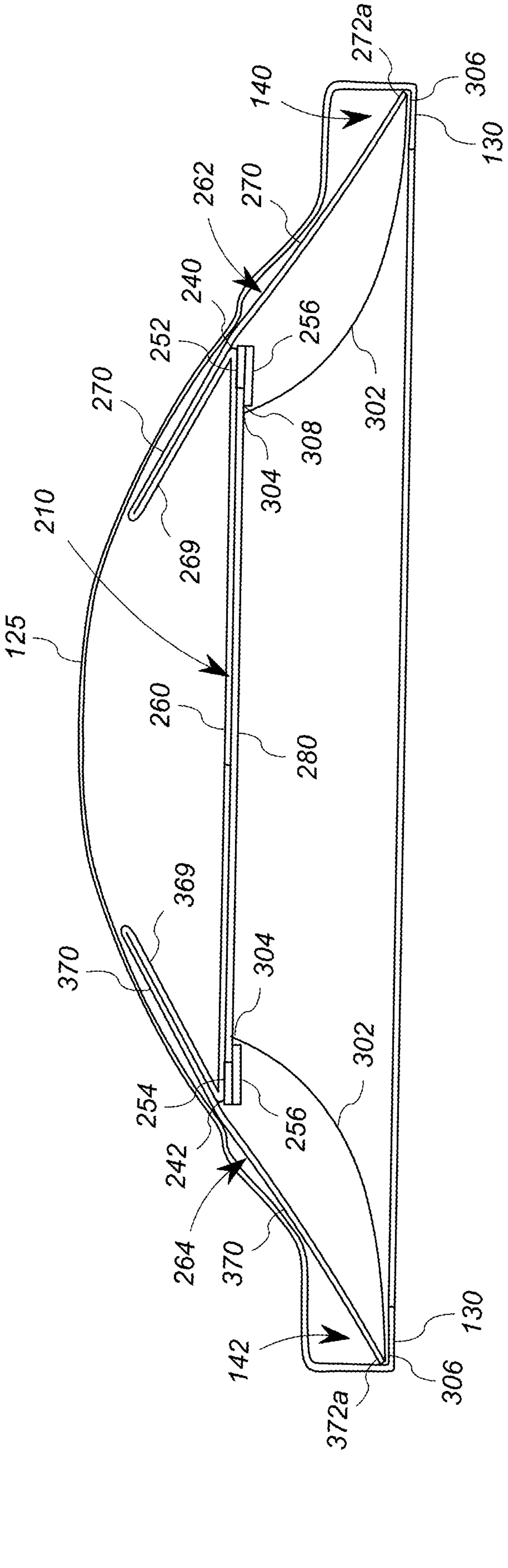
FIG. 3 shows a cutaway view of the lid and casket top interior of FIG. 2.

FIG. 2 shows a perspective view of the first lid 120, the casket top interior 150 and center panel 200 with the center panel 200 removed from the casket top interior 150. FIG. 3 shows a cutaway view of the first lid 120 and the casket top interior 150. With reference to FIGS. 1, 2 and 3, The first lid 120 includes a lid wall 125, and first, second, third and fourth bottom ledges 130, 132, 134 and 136, respectively, forming a rectangular ledge structure disposed at a bottom periphery of the lid wall 125. The lid wall 125 is the portion (or portions) of the first lid 120 that extend over the interior 104, as well as any panels or parts that extend from that portion downward to the ledges 130, 132, 134 and 136. It will be appreciated that the lid wall 125 in this embodiment includes a contoured shape and a short vertical wall around the periphery that extends down to the bottom ledges 130, 132, 134 and 136. It will be appreciated that the top wall 125 in other embodiments can take other shapes, whether arcuate, angular or box-like. Other embodiments also often include vertical walls that do not necessarily extend over the interior, but rather just extend down to the bottom ledges 130, 132, 134 and 136.

With particular attention to FIG. 3, each of the ledges 130, 132, 134 and 136 defines a corresponding nook in an underside of the first lid 120. In this case, each of the nooks is defined by the corner or intersection of the top surface of a corresponding ledge 130, 132, 134, and 136, and the bottom end of the lid wall 125. FIG. 3 shows the first nook 140, defined by the underside of the lid wall 125 and the first ledge 130, and the second nook 142, defined by the underside of the lid wall 125 and the second ledge 132. The nooks formed by the ledges 134, 136 are similar, but are not visible.

Referring again to FIGS. 1, 2 and 3 contemporaneously, the casket top interior 150 includes a roll kit 275 and a backer board 210 (See FIG. 3). The roll kit 275 includes four rolls 282, 284, 286 and 288 that are decorative edge structures known in the art. In this embodiment, the roll kit 275 further includes a rectangular center roll panel 280 (See FIG. 2). The four rolls 282, 284, 286 and 288 are coupled proximate to respective edges of the center roll panel 280, such that the rolls 282, 284, 286 and 288 and roll panel 280 cover substantially all of the backer board 210, as shown in FIGS. 2 and 3. In other embodiments, the roll kit may include separate rolls 282, 284, 286 and 288 without a center roll panel 280.

In general, the backer board 210 and roll kit 275 cooperate to cover most of, and in this embodiment, substantially all of, the underside of the lid wall 125 (within or without the roll panel 280), in order to hide structural features such as bracing thereof. As shown in FIGS. 2 and 3, the roll kit 275 as supported by the backer board 210 forms a frame area 208 in which the center panel 200 may be supported. The center panel 200, when installed, supported by the backer board 210 through the center roll panel 280, and extends between the rolls 282, 284, 286 and 288 as shown in FIGS. 1 and 2. The backer board 210 and roll kit 275 are operably coupled to the lid 120 such that when the lid 120 is open or closed, the casket top interior 150 remain in place on the underside of the lid 120.

Figure 4:
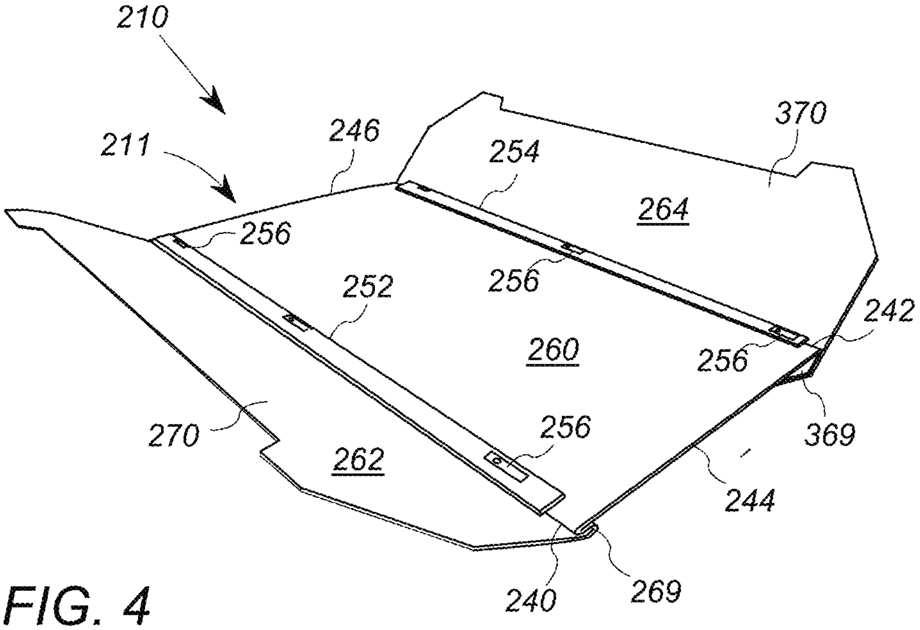
FIG. 4 shows a bottom perspective view of an exemplary embodiment of a backer board of the casket top interior of FIG. 2.
Figure 5:
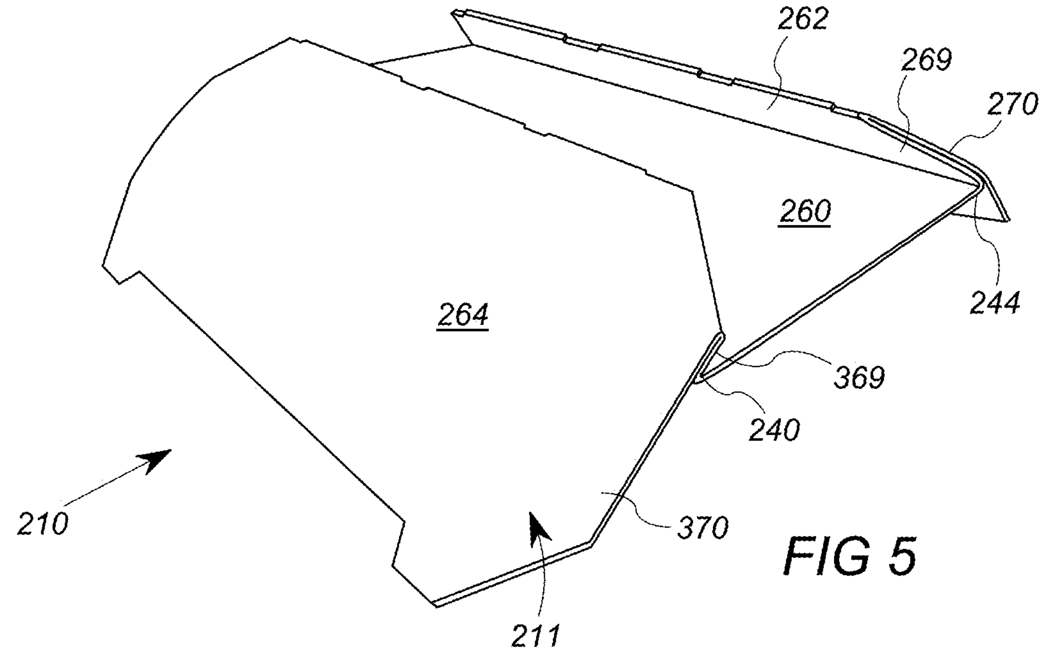
FIG. 5 shows a top perspective view of the backer board of FIG. 4.
Figure 6:
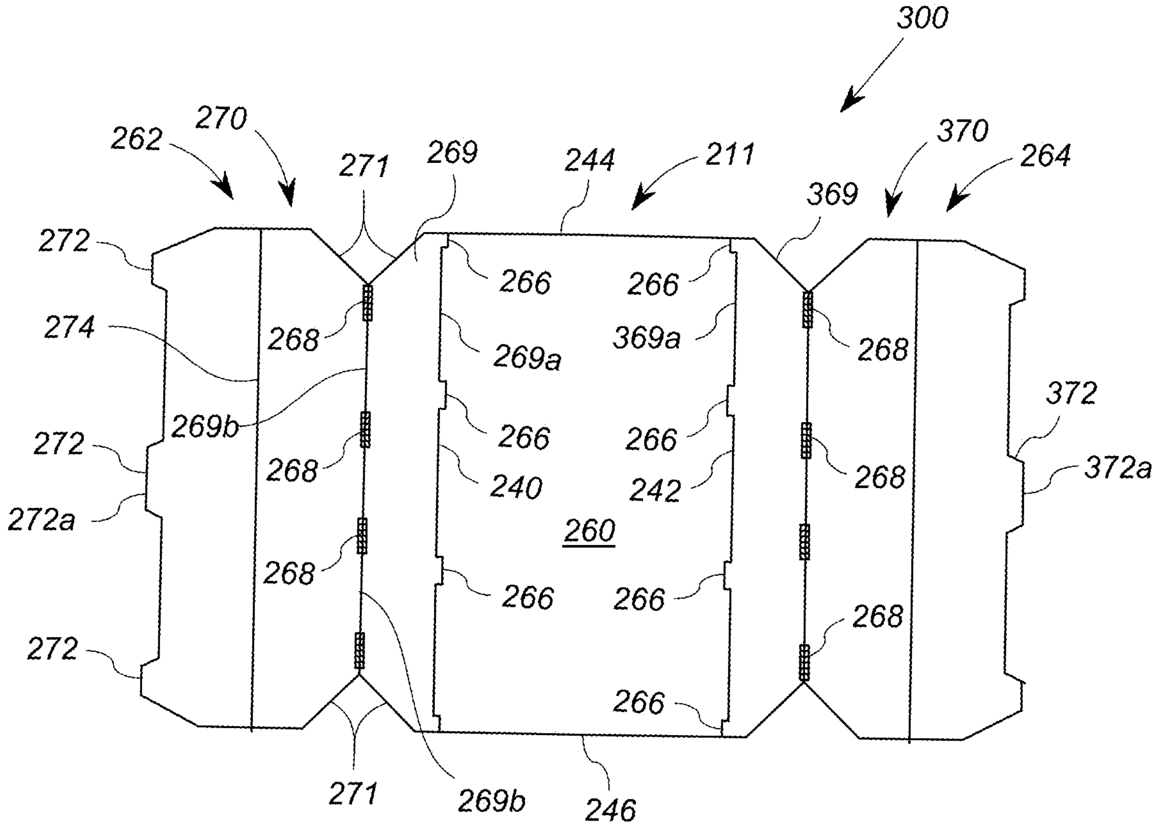
FIG. 6 shows a top plan view of a blank from which the body of the backer board of FIG. 4 may be constructed.

The backer board 210 is shown in further detail in connection with FIGS. 4, 5 and 6. FIG. 4 shows a bottom perspective view of the backer board 210, and FIG. 5 shows a top perspective view of the backer board 210. FIG. 6 shows a diagram of a single piece or corrugated fiberboard blank 300 from which the body 211 of the backer board 210 may be constructed.

With reference to FIGS. 3 through 6, the body 211 of the backer board 210 is formed of a pliable material, and includes a center wall 260, a first side wall 262, and a second side wall 264. In this embodiment, the backer board 210 further includes a first stiffening rail 252 and a second stiffening rail 254, each affixed to the body 211. The center wall 260 is a substantially rectangular panel having two opposite long edges 240, 242, and two opposite short or end edges 244, 246. The center wall 260 is preferably approximately the size of, but slightly larger than, a standard casket lid center panel, such as the panel 200. As shown in FIGS. 3, 4, and 5, the first side wall 262 is coupled to the backer board 210 at the first edge 240, and extends away therefrom. Similarly, the second side wall 264 is coupled to the backer board 210 at the second edge 242, and extends away therefrom. The first side wall 262 and the second side wall 264 are configured to engage, respectively, the first and second nooks 140, 142 of the lid 120 under a tension sufficient to hold the center wall 260 in a predetermined position on or over central area of the underside of the lid wall 125 of the lid 120.

To this end, in this embodiment, the side walls 262 and 264 are coupled to opposite sides of the center wall 260 by hinges 266. The hinges 266 are formed at (and define) the first and second edges 240, 242 of the center wall 260. The hinges are formed by uncut corrugated fiberboard connections of the blank 300 between the side walls 262, 264 and the center wall 260.

The first side wall 262 includes a fold back wall 269, a main wall 270 and a plurality of tabs 272. The fold back wall 269 in this embodiment has a first edge 269*a* that is coextensive with the first edge 240 of the center wall 260 and is coupled thereto by the hinges 266. The main wall 270 is coupled to the opposite edge 269*b* of the foldback wall 269 by hinges 268. The hinges 268, similar to the hinges 266, are formed intrinsically from the die-cut corrugated fiberboard blank 300 that forms the body 250 when folded.

The main wall 270 is generally coextensive in length with the long edge 240 of the center wall 260. In this embodiment, however, the connecting edge between the main wall 270 and fold back wall 269 may have chamfered corners 271 as shown in FIG. 6. The main wall 270 has a width extending from the fold back wall 269 that is approximately equal to the width of the fold back wall 269 plus a distance sufficient to extend diagonally or otherwise from the center wall 260 to the underside of the ledge 132 (see FIG. 3) of the casket lid 120 when installed. The main wall 270 may have a longitudinal fold line 274 disposed between its two long edges to allow for additional flexibility in installation, as will become more readily apparent below. It will be appreciated that the fold lines may be pre-stressed or otherwise prepared as is known in the art to facilitate subsequent folding in along a predetermined line. The tabs 272 extend outward from the outer edge of the main wall 270, and are configured to engage the ledge 132 in the nook 140 (see FIG. 3) of the casket lid 120 when installed. The tabs 272 are optional, and are useful to provide (via the voids between the tabs 272) openings to accommodate structural elements of the underside of the lid 120 (e.g. bracing, not shown), that could exist on the ledges 132, 134.

Similarly, the second side wall 264 includes a fold back wall 369, a main wall 370 and a plurality of tabs 372 that are similar in structure and function as the fold back wall 269, main wall 270 and tabs 272 of the first side wall 262. Accordingly, the fold back wall 369 in this embodiment has a first edge 369*a* that is coextensive with the second edge 242 of the center wall 260 and is coupled thereto by more hinges 266. The main wall 370 is coupled to the opposite edge 369*b* of the foldback wall 369 by hinges 268.

In this embodiment, the fold back walls 269, 369 help facilitate the tension that helps hold backer board 210 in place in the casket lid 120. To this end, as constructed in the casket 100, the fold back walls 269, 369 are folded back behind the center wall 260 via the hinges 266. This configuration is shown in FIGS. 3 through 5, although the casket 100 itself is not shown in FIGS. 4 and 5. The main wall 270 is, in turn, folded back from the fold back wall 269 to extend away from both the center wall 260 and the fold back wall 269 toward the first nook 140.

Similarly, the main wall 370 folded back from the fold back wall 369 to extend away from both the center wall 360 and the fold back wall 369 toward the second nook 142. The tabs 272 are trap fit in the first nook 140, while tabs 372 are trap fit into the second nook 142. It will be appreciated that the tabs 272, 372 define the opposite edges 272*a*, 372*a* of the backer board 210, and can be replaced in some embodiments by a straight edge, a contoured edge, or other edge structures. The overall distance between the opposite edges 272*a*, 372*a* in an unstressed position, even folded, is greater than the distance between the nooks 240, 242. Accordingly, when backer board 210 is installed, the main walls 270, 370 and/or the fold back walls 269, 369*s* such that they provide tension that holds the center wall 260 in position over a central area of the underside of the lid wall 125 as shown in FIG. 3, and in FIG. 9, which is discussed further below.

Referring again to FIGS. 3 and 4, each of the stiffening rails 252, 254 is a thin, elongate bar that is coupled to an upper side of center wall 260, along and parallel to a respective long edge 240, 242 thereof. More specifically, the first stiffening rail 252 is affixed to the center wall 260 proximate the first edge 240, and the second stiffening rail 254 affixed to the center wall 260 proximate the second edge 242. Thus, each of the stiffening rails 252, 254 is coupled to the center wall 260 proximate to corresponding sets of hinges 266. The stiffening rails 252, 254 may be constructed of a wood product, or corrugated fiberboard, or other fiberboard structure.

Each stiffening rail 252, 254 has a plurality of clips 256 attached to a top side thereof. Each clip 256 may suitably be a short rectangular block, metal bar, or the like, which is rotatably coupled to one of the stiffening rails 252 or 254. The rotatable coupling may be accomplished by a single fastener, which forms the axis of rotation of the clip 256. As will be discussed below in further detail, the clips 256 are configured to engage edges of the center roll panel 280 of the roll kit 275 to anchor the rolls 282, 284, 286 and 288 proximate to the center wall 260. In other embodiments, the clips 256 can engage another structure formed on each individual roll 282, 284, or engage the rolls 282, 284 direct.

With reference to FIGS. 2 and 3, each of the side rolls 282, 284 comprises a curved body 302 having a first edge 304 and an opposite second edge 306, and at least one attachment strip 308 coupled to the first edge 304 of the curved body 302. In this embodiment, each side roll 282, 284 is formed of shaped fiberboard stock. The attachment strip 308 in this embodiment is attached (via fastener or adhesive) to the center roll panel 280, which in turn is operably coupled to the backer board 210. Thus, the attachment strip 308 of each of the side rolls 282, 284 is coupled adjacent to the center wall 260 near one of the first edge 240 and the second edge 242 of the center wall 260. The second edge 306 of the curved body 302 of each side roll 282, 284 engages a respective one of the first bottom interior ledge 130 and second bottom interior ledge 132 of the casket lid 120, adjacent to the outermost edges 272*a*, 372*a* of respective side walls 262, 264 of the backer board 210. (See FIG. 3). The side rolls 282, 284 are installed to cover or hide from view a portion of the underside of the lid wall 125, and the respective stiffening rails 256.

Each end roll 286, 288 has a similar construction, and comprises a curved body having a first edge and an opposite second edge. In this embodiment, the first edge of each end roll 286, 288 is attached to the center roll panel 280 and thus dispose adjacent a respective end edge 244, 246 of the center wall 260. The second edge of each end roll 286, 288 is disposed against a respective one of the third bottom interior ledge 134 and second fourth interior ledge 136 of the casket lid 120.

Figure 7:
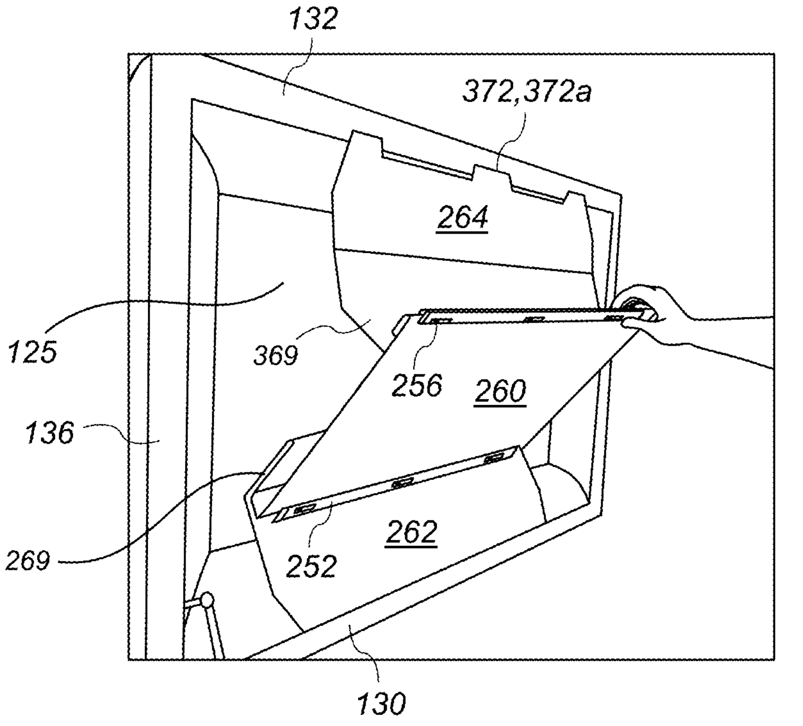
FIG. 7 shows a perspective view of the backer board of FIG. 4 partially installed in the casket lid of the casket of FIG. 1.
Figure 8:
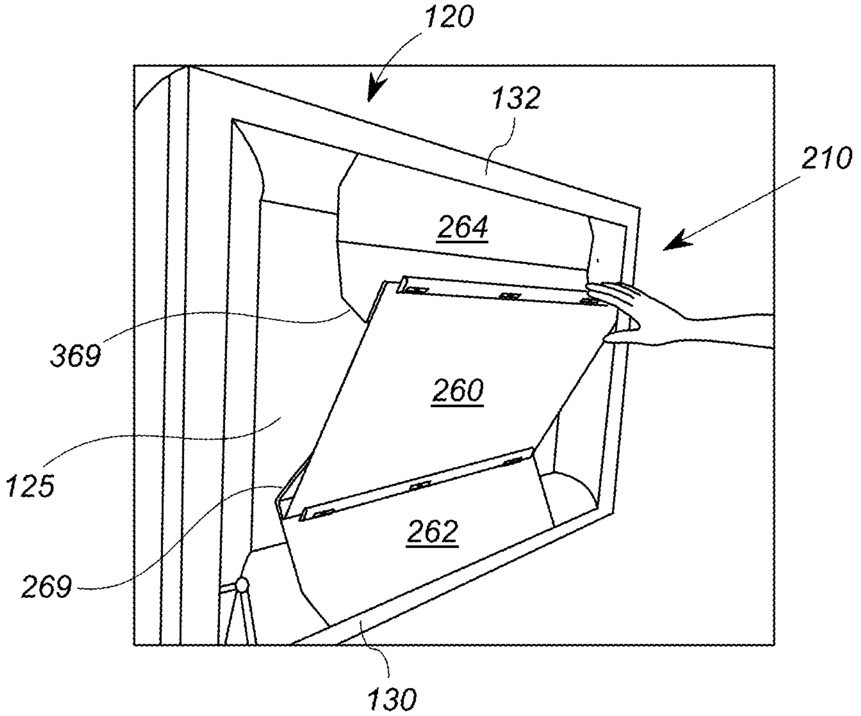
FIG. 8 shows a perspective view of the backer board of FIG. 4 further partially installed in the casket lid.

FIGS. 7 through 11 show a process of installing the casket top interior 150 into the casket lid 120. The process includes first installing the backer board 210 according to embodiments described herein into the casket lid 120. In particular, FIG. 7 shows a perspective view of a partially inserted backer board 210. In FIG. 7, one side wall 262 is completely installed, and the other side wall 264 is not yet installed. As shown in FIGS. 7 and 8, the fold back walls 269, 369 of the side walls 262, 264 are folded back behind the back side of the center wall 260. The tabs 272, 372 (edges 272*a*, 372*a*) are then installed between the respective ledges 130, 132 and the lid wall 125 into the respective nooks 140, 142 (see FIG. 3). In the position illustrated in FIG. 8, the tabs 272, 372 (or simply edges 272*a*, 372*a*) are not visible because they have all been installed into the respective nooks 140, 142 formed by the opposing long ledges 130, 132, as shown in FIG. 3.

Figure 9:
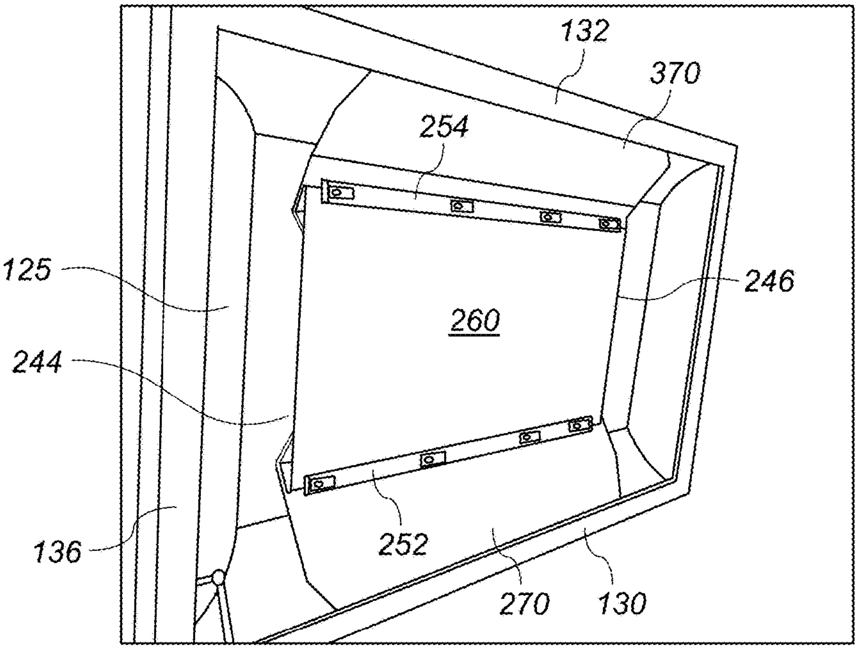
FIG. 9 shows a perspective view of the backer board of FIG. 4 fully installed in the casket lid of the casket of FIG. 1.

After the edges 272*a*, 372*a* of both side walls 262, 264 are trapped, (see FIG. 8), the various hinges 266, 268 allow the folded main body 211 to be snap-fit into place by pushing the center wall 260 back towards the lid wall 125. When complete, the backer board 210 is disposed in the lid 120 as shown in FIG. 9. As shown in FIG. 9, the center wall 260 forms a flat support surface that is approximately the same size as a conventional center board panel (e.g. panel 200 of FIG. 1), and the side walls 262, 264 as folded hold the center wall 260 in a predetermined position. Because of the design of the side walls 262, 264, each of the flat top surfaces of the stiffening rails 252, 254 lie in a plane parallel to the plane of the center wall 260, and preferably parallel to the flat bottom ledges 130, 132 of the casket lid 120. As a consequence, the axes of rotation of the clips 256 on both of the stiffening rails 252, 254 are all substantially parallel.

Figure 10:
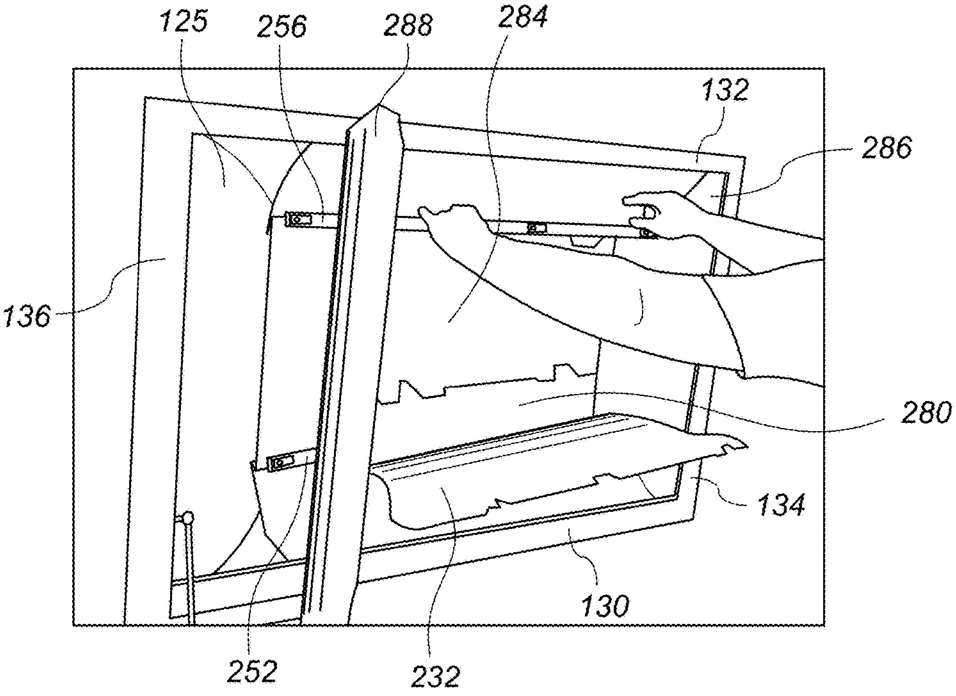
FIG. 10 shows a perspective view of the roll kit of the casket top interior of FIG. 2 partially installed in the casket lid.
Figure 11:
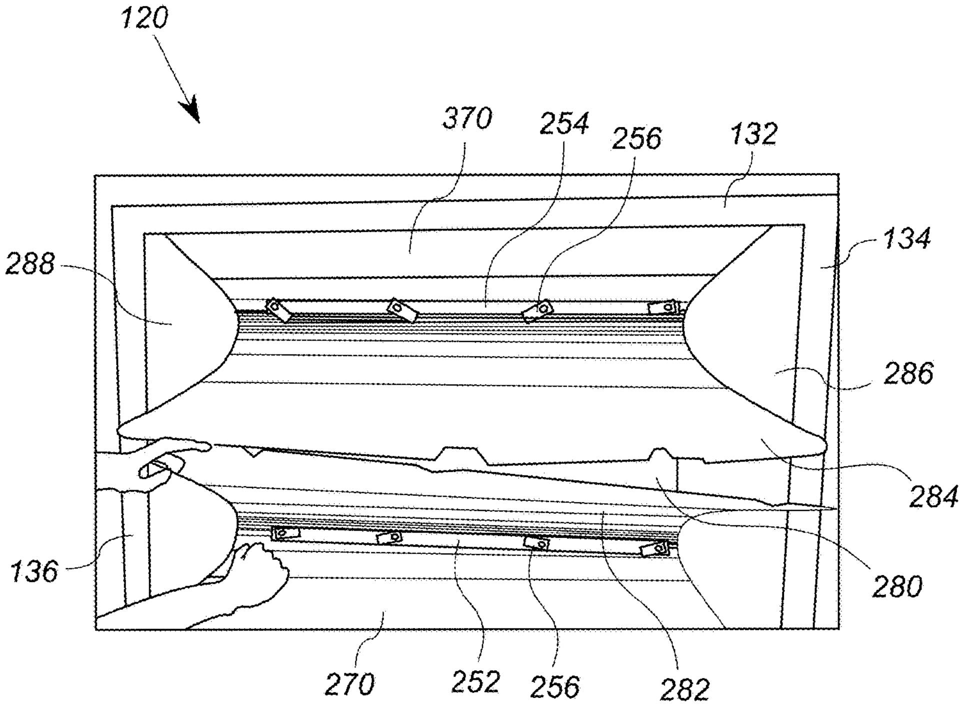
FIG. 11 shows a perspective view of the roll kit of the casket top interior of FIG. 2 further partially installed in the casket lid.

Once the backer board 210 is fully installed in the lid 120 as shown in FIG. 9, the roll kit 275 may be installed in the lid 120. With reference to FIGS. 10 and 11, the center roll panel 280 of the roll kit 275 is rectangular, and has a size and shape generally corresponding to that of the center wall 260 of the backer board 210. More specifically, the center roll panel 280 has a length approximately the same as the center wall 260, and a width that extends between, and up to, inside edges of the first stiffening rail 252 and the second stiffening rail 254. As discussed above, the roll kit 275 also includes the two long side rolls 282, 284 coupled via their attachment strips 308 to the opposing long edges of the flat center roll panel 280, and two short side rolls 286, 288 similarly coupled to the opposing short edges of the center roll panel 280. The roll kit 275 may suitably be formed of paperboard, corrugated fiberboard, or other flexible product. The center roll panel 280 in some cases may be a different material than one or all of the rolls 282, 284, 286, and 28, which case the side panels are attached by adhesive or other means, but are still foldable with respect to the center roll panel 280 at the place of connection. At least the side panels 282, 284, 286 and 288 have a smooth finish or coating which may be white and/or one or more other colors to form an aesthetically pleasing surface.

In FIG. 10, it can be seen that the center roll panel 280 of the roll kit 275 is first aligned to the center wall 260 of the backer board 210. The long edges of the center roll panel 280 are then fit between the first stiffening rail 252 and the second stiffening rail 254 and against the top surface of the center wall 260. The long side rolls 282, 284 extend outward from the center wall 260 of the backer board 210. This is shown in FIGS. 10 and 11. As also shown in FIGS. 10 and 11, the short side rolls 286, 288 are flexed, so that their outer edges can be tucked into nooks, not shown formed between short ledges 134, 136 and the lid wall 125.

FIG. 11 shows the center roll panel 280 and the short side rolls 286, 288 of the roll kit 275 installed. When the center roll panel 280 is installed, the clips 256 are rotated to secure the center roll panel 280 against the center wall 260 of the backer board 210. FIG. 11 shows the clips 256 on the second stiffening rail 254 rotated to secure the second long edge of the center roll panel 280, and the clips 256 of the first stiffening rail 252 not yet rotated to secure the opposing long edge. It will be appreciated that the clips 256, when rotated, can also engage and/or retain a a portion of the attachment strip 208 of each of the long side rolls 282, 284. In some embodiments, if the side rolls 282, 284 are not intrinsically formed with the center roll panel 280, then the side rolls 282, 284 can be attached to the center roll panel 280 in a position that would not engage the clips 256.

Figure 12:
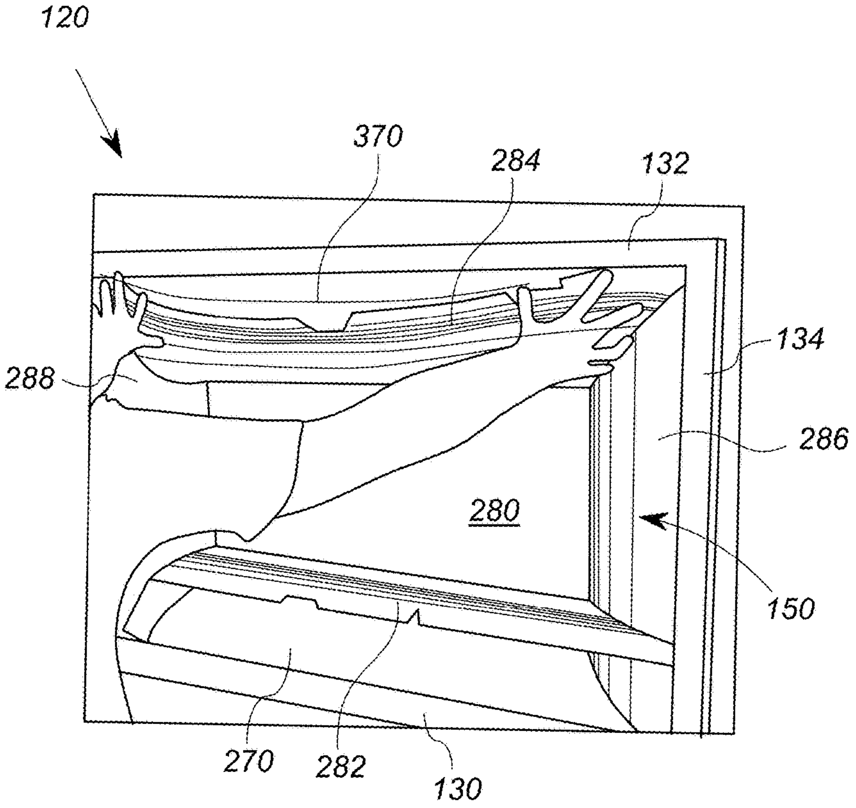
FIG. 12 shows a perspective view of the roll kit of the casket top interior of FIG. 2 further installed in the casket lid.

FIG. 12 shows the final installation of the roll kit 275 on the backer board 210. In particular, once the clips of both stiffening rails 252, 254 have been rotated to secure the center roll panel 280 in place, the long side rolls 282, 284 are flexed outward, and their exterior edges 306 are inserted into the nooks 140, 142 between the ledges 130, 132 and the lid wall 125 of the lid 120. The result is shown in FIGS. 2 and 3.

It will be appreciated that the backer board 210 provides advantages even if the roll kit 275 takes some other format. The backer board 210 provides an easy to assembly, robust base on which further decorative elements may be mounted or attached. Some versions need not include the clips 256, for example, in designs of the roll kit 275 or some other roll structure that can be attached direction to the backer board 210 some other way, with or without the stiffening rails 252, 254.

The backer board 210 can be particularly useful in metal caskets, where attaching structures to the underside of the metal lid presents challenges.

Another advantage in the embodiment casket top interior 150 is that the easy attachment and release of roll kit 275 in arrangement allows for easy replacement. In particular, it is not uncommon to employ rental caskets (with non-reusable casket inserts) for funerary viewing purposes. The rental casket can be reused, because on the deceased can be transported to cremation or other final resting place in the relatively inexpensive single-use casket insert. The result is cost savings to the bereaved. While the rolls 282, 284, 286 and 288 can often be reused, it is possible that the rolls on the rental casket lid can get stained during use, thus requiring replacement. The present embodiment allows for easy replacement of the roll kit 275 (whether or not the roll kit 275 utilizes a center roll panel 280), because the roll kit need not be attached using fasteners or adhesives.

In some cases, elaborate rolls are not necessary. For example, in one alternative embodiment, the backer board 210 is adapted to a casket lid interior such that it covers underside of the lid without the roll kit or other roll structures.

Figure 13:
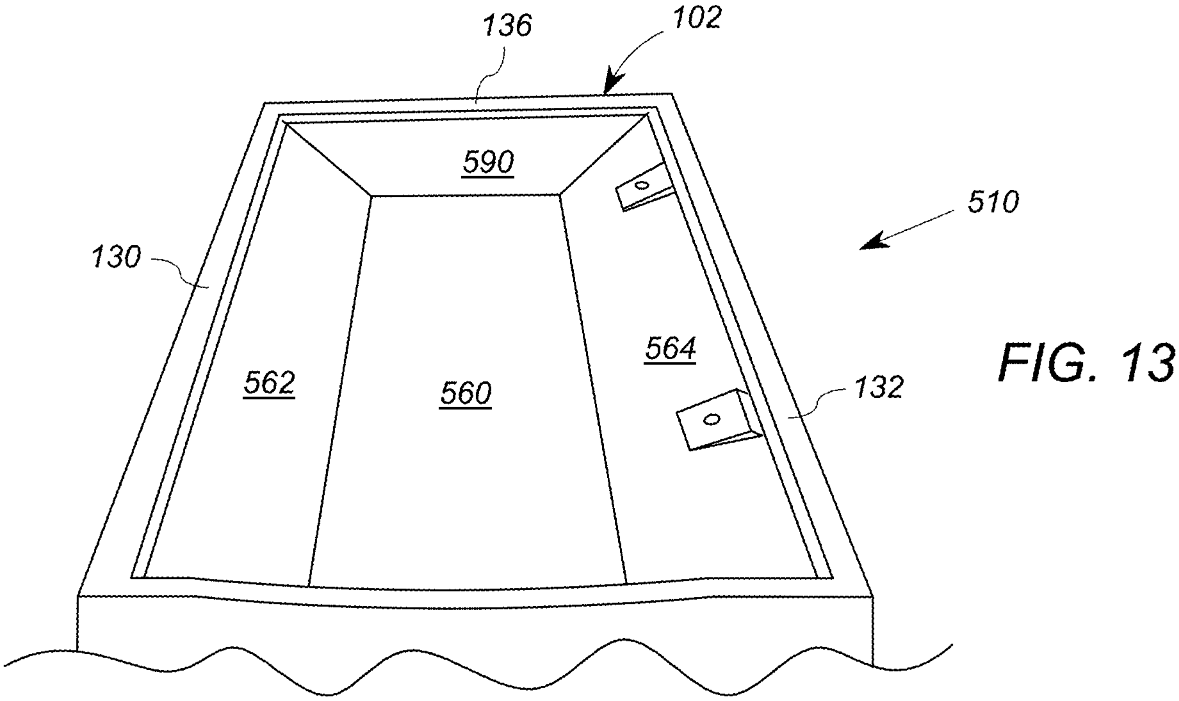
FIG. 13 shows a perspective view of an alternative embodiment of a backer board and casket top interior inserted in a lid of casket.
Figure 14:
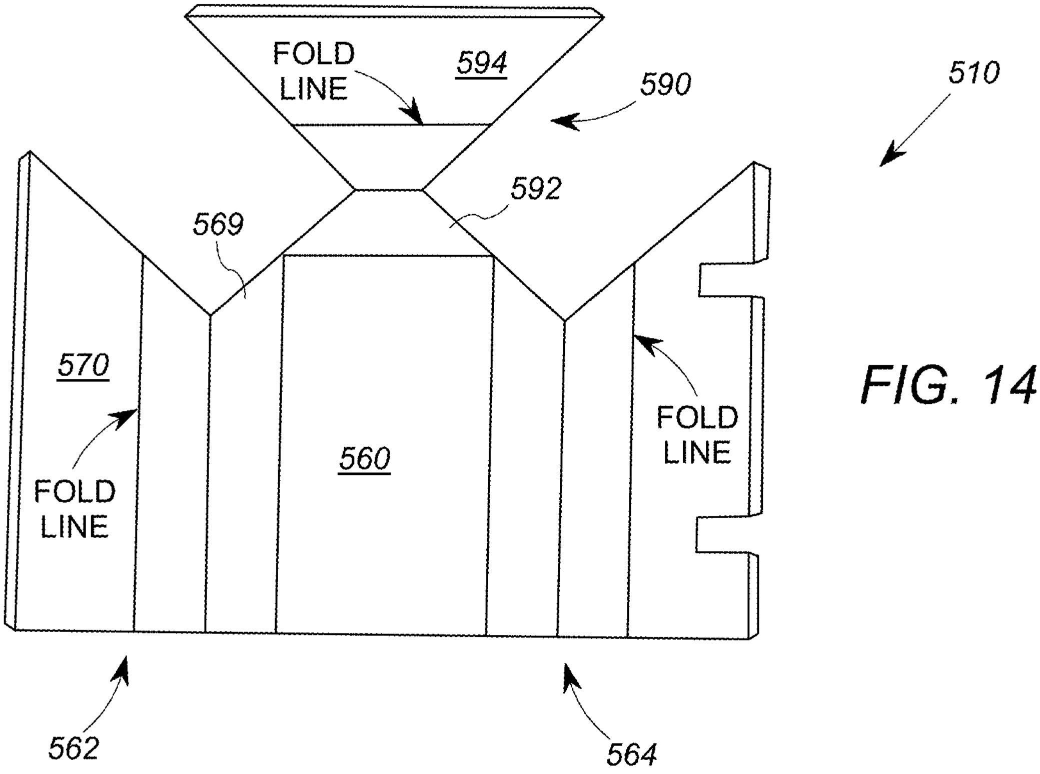
FIG. 14 shows a top plan view of a blank from which the backer board of FIG. 13.

FIG. 13 shows a plan view of a half casket lid (that would combine with another similar half lid in final use on the full length adult casket) having a backer board 510 having angled side panels to provide a cost-effective aesthetic cover over the underside of the lid. FIG. 14 shows the board 510 as an unfolded blank. In this embodiment, the backer board 510 can itself form an alternative embodiment of a casket top interior without a separate roll kit.

With reference to FIGS. 13 and 14, the board 510 includes a center wall 560, a first side wall 562, a second side wall 564 and a third side wall 590. The center wall 560 is preferably rectangular, and approximately the size of a standard casket insert center panel. The side walls 562 and 564 are coupled to opposite sides of the center wall 560 by hinges substantially similar to hinges 266 of FIG. 6 (not shown in FIG. 13) formed by uncut corrugated fiberboard connections between the side walls 562, 564 and the center wall 560. The side wall 562 includes a fold back wall 569, a main wall 570 and at least one end tab or other outer edge of the main wall 570. The fold back wall 569 in this embodiment has a first edge that is coextensive with the long edge of the center wall 560 and is coupled thereto by the hinges. The main wall 570 is coupled to the opposite edge of the fold back wall 569 by hinges substantially similar to hinges 268 of FIG. 6.

The main wall 570 is generally coextensive in length with the long edge of the center wall 560. In this embodiment, however, the connecting edges of the main wall 570 and fold back wall 569 may have chamfered corners as shown in FIG. 13. Also, the main wall 570 flairs further outward as shown in FIG. 13, as it is intended to at least partially cover the corner of the underside of a casket lid, such as the lid 120, or a lid that has an open end for use in a casket with two half-lids. The main wall 570 has a width extending from the fold back wall 569 that is approximately equal to the width of the fold back wall 569 plus a distance sufficient to extend diagonally or otherwise from the center wall 560 to the underside of the first ledge 130 (see FIGS. 1 and 2) of the casket lid 120 when installed. The main wall 570 may have a longitudinal fold line disposed between its two long edges to allow for additional flexibility in installation. It will be appreciated that the fold lines may be pre-stressed or otherwise prepared as is known in the art to facilitate subsequent folding in along a predetermined line. The tab at the outer edge of the main wall 570 can be the entire length of the outer edge of the main wall. Alternative, multiple small tabs similar in structure and design as tabs 272 of FIG. 6 may be used. In this embodiment, the tab as shown in FIG. 13 extends outward from the outer edge of the main wall 170, and is configured to engage the first ledge 130 of the casket lid 120, in the nook 140, when installed.

The side wall 564 has substantially the same configuration as the side wall 562, but is arranged as a mirror image of the side wall 562, coupled to the opposite long edge of the center wall 560. It is similarly configured to engage, for example, the second ledge 132 in the nook 142 of the casket lid 120. The side walls 562, 564 thus provide the same snap-in construction and tension to hold the backer board 510 in place over the underside of the lid body 125 as that of the backer board 210 of FIGS. 3 through 6.

Referring again to FIGS. 13 and 14, the side wall 590 includes a fold back wall 592, a main wall 594 and at least one end tab at the outer edge of the main wall 594. The fold back wall 592 in this embodiment has a first edge that is coextensive with the short edge of the center wall 560 and is coupled thereto by the hinges similar to the hinges 266 of FIG. 6. The main wall 594 is coupled to the opposite edge of the fold back wall 592 by hinges substantially similar to hinges 268 of FIG. 6.

The main wall 594 is generally coextensive in length with one of the short edges of the center wall 560. In this embodiment, however, the connecting edges of the main wall 594 and fold back wall 592 may have chamfered corners as shown in FIG. 13. Also, the main wall 594 flairs further outward as shown in FIG. 13, as it is intended to at least partially cover the corner of the underside of the 120 when installed. The main wall 594 has a width extending from the fold back wall 592 that is approximately equal to the width of the fold back wall 592 plus a distance sufficient to extend diagonally or otherwise from the center wall 560 to the underside of the end ledge 134 (see FIGS. 1 and 2) of the casket lid 120 when installed. The main wall 594 may have a longitudinal fold line disposed between its two long edges to allow for additional flexibility in installation. The tab at the outer edge of the main wall 594 can extend the entire length of the outer edge of the main wall. Alternative, multiple small tabs similar in structure and design as tabs 272 of FIG. 6 may be used. In this embodiment, the tab as shown in FIG. 13 extends outward from the outer edge of the main wall 594, and is configured to engage the nook, not shown, between the end ledge 136 and the lid wall 125 of the casket lid 120 when installed.

The installation of the board 510 is similar to that of the main body 211 as shown in FIGS. 7 through 9. However, the installation further includes the installation of the side wall 590, which would be installed similar to the way the side walls 562, 564 are installed, except that the edge of the main wall 594 would be trapped between the end ledge 136 and the lid body 125.

It will be appreciated that although the above embodiments of the casket top interior are demonstrated in a half-lid, the designs may readily be adopted for use in a so-called full couch lid.

It will be appreciated that the above-described embodiments are merely illustrative, and that those of ordinary skill in the art may readily devise their own modifications and implementations that incorporate the principles of the present invention and fall within the spirit and scope thereof.

The invention claimed is:

1. A casket comprising:

a casket body configured to receive an adult human body in a supine position;

at least a first lid having a first bottom interior ledge defining a first nook in an underside of the first lid, and a second bottom interior ledge defining a second nook in the underside of the first lid; and a backer board formed of a pliable material including a center wall having a first edge and a second edge opposite to the first edge, a first side wall coupled to the center wall and extending away from the first edge, and a second side wall coupled to the center wall and extending away from the second edge, the first side wall and the second side wall configured to engage, respectively, the first and second nooks, under a tension configured to hold the center wall in a predetermined position; and wherein the first wall has a fold back portion that is folded back behind the center wall, and a main portion that is further folded back from the fold back portion to extend away from the center wall and the fold back portion toward the first nook.

2. The casket as claimed in claim 1, wherein the first side wall and the center wall are formed from the same blank and are foldably connected at the first edge, and wherein the second side wall and the center wall are formed from the same blank and are foldably connected at the second edge.

3. The casket as claimed in claim 1, further comprising a first stiffening rail and a second stiffening rail, the first stiffening rail affixed to the first side wall proximate the first edge, and the second stiffening rail affixed to the second side wall proximate the second edge.

4. The casket as claimed in claim 3, further comprising:

at least a first roll and a second roll, the first roll operably coupled to the backer board proximate the first edge, and the operably second roll coupled to the back board proximate the second edge, the first roll configured to cover at least an exposed portion of the first side wall when said first side wall and the first roll engages the first bottom interior ledge of the first lid.

5. The casket as claimed claim 4, wherein the first stiffening rails includes a first plurality of clips, the first plurality of clips configured to operably couple at least the first roll adjacent to or against the center wall.

6. The casket as claimed in claim 4, wherein:

the roll comprises a curved body having a first edge and an opposite second edge;

the first edge of the curved body is operably coupled proximate to the backer board; and the second edge of the curved body engages the first bottom interior ledge of the first lid.

7. A casket top interior arrangement comprising:

a backer board including a center wall having a first edge and a second edge opposite to the first edge, a first side wall coupled to the center wall and extending away from the first edge, and a second side wall coupled to the center wall and extending away from the second edge, the first side wall and the second side wall configured to engage a nook in an underside of a casket lid under a tension configured to hold the center wall in a predetermined position; and at least a first roll and a second roll, the first roll coupled to the backer board proximate the first edge, and the second roll coupled to the backer board proximate the second edge; the first roll configured to cover at least an exposed portion of the first side wall when said first side wall and the first roll engage the nook on the underside of the casket lid; and wherein the first side wall and the center wall are formed from the same blank and are rotatably connected at the first edge.

8. The casket top interior arrangement as claimed in claim 7, wherein the second side wall and the center wall are formed from the same blank and are foldably connected at the second edge.

9. The casket top interior arrangement as claimed in claim 8, further comprising a first stiffening rail and a second stiffening rail, the first stiffening rail affixed to the first side wall proximate the first edge, and the second stiffening rail affixed to the second side wall proximate the second edge.

10. The casket top interior arrangement as claimed in claim 9, wherein the first stiffening rail includes a first plurality of clips, the first plurality of clips configured to operably couple the first roll to at least in part retain the edge of the first roll in position adjacent to or against the center wall.

11. The casket top interior arrangement of claim 7, wherein the first wall has a fold back portion that is folded back behind the center wall, and a main portion that is further folded back from the fold back portion to extend away from the center wall and the fold back portion.

12. The casket top interior arrangement as claimed in claim 11, further comprising a first stiffening rail and a second stiffening rail, the first stiffening rail affixed to the first side wall proximate the first edge, and the second stiffening rail affixed to the second side wall proximate the second edge.

13. The casket top interior arrangement as claimed in claim 7, wherein the first side wall is configured to engage a corner of the nook in the underside of the casket lid.

14. The casket as claimed in claim 1, wherein the first side wall and the center wall are formed from the same blank and are rotatably connected at the first edge.

15. A backer board for a casket top interior, comprising:

a center wall having a first edge and a second edge opposite to the first edge;

a first side wall coupled to the center wall and extending away from the first edge, and a second side wall coupled to and extending away from the second edge, the first side wall and the second side wall configured to engage a nook in an underside of a casket lid under a tension configured to hold the center wall in a predetermined position;

wherein the first side wall is foldably connected to the first edge, and the second wall is foldably connected to the second edge; and wherein each of the first side wall and the second side wall has a fold back portion that is folded back behind the center wall, and a main portion that is further folded back from the fold back portion to extend away from the center wall and the fold back portion.

16. The backer board as claimed in claim 15, further comprising a first stiffening rail and a second stiffening rail, the first stiffening rail affixed to the first side wall proximate the first edge, and the second stiffening rail affixed to the second side wall proximate the second edge.

17. The backer board as claimed in claim 16, wherein the first stiffening rail includes a first plurality of clips, the first plurality of clips configured to engage an edge of a casket lid roll and at least in part retain the edge of the casket lid roll in position adjacent to or against the center wall.

* * * * *